Patented Dec. 19, 1950

2,534,244

UNITED STATES PATENT OFFICE 2,534,244

8-HALOXANTHINE SALTS OF 2-(PHENYL-BENZYLAMINO - METHYL)IMIDAZOLINE AND THE PRODUCTION THEREOF

John W. Cusic, Skokie, Ill., assignor to G. D. Searle & Co., Chicago, Ill., a corporation of Illinois No Drawing. Application November 16, 1949, Serial No. 127,800

7 Claims. (Cl. 260—253)

This invention relates to 8-haloxanthine salts of organic bases of the following general structural formula

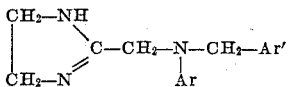

wherein Ar and Ar' are monocyclic aromatic radicals, and wherein the 8-haloxanthine contains a hydrogen atom in position 7. This invention also relates to methods of preparing such compounds.

In the foregoing structural formula Ar and Ar' represent the same or different monocyclic aromatic radical and include phenyl, tolyl, chlorophenyl, bromophenyl, iodophenyl, methoxyphenyl, ethoxyphenyl, xylyl, and similar radicals of the benzene series.

This application is a continuation-in-part of my copending application Serial No. 71,763, filed January 19, 1949.

It is recognized that organic bases of the foregoing structural formula, which are widely used as antihistaminic drugs, elicit certain undesirable side reactions and toxic manifestations, the most common of which are drowsiness and dizziness. It is the object of this invention to produce new therapeutic substances which are relatively free from such untoward reactions. Another object is to produce salts of antihistaminic agents of the foregoing type and haloxanthines which have reduced toxicity. A further object is to produce such salts having enhanced therapeutic efficacy. Other objects will be apparent to those skilled in the art in view of the disclosure given herein.

I have discovered that salts of organic bases of the foregoing formula with haloxanthines produce little effect on the central nervous system and appear to be more useful therapeutically than any of the individual components alone. Such salts exert a potentiating effect and show enhanced activity in combatting the effects of histamine. They are particularly useful in the treatment of anaphylaxis and allergic disorders. Certain of the salts within the scope of this invention are so free from undesirable side effects that they may be used in the treatment and prevention of motion sickness.

Among the halogenated xanthines to which this invention pertains are the chloro, bromo, and iodo derivatives of theophylline and related xanthines which have a hydrogen atom in position 7.

In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the organic bases are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid organic base and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the organic base. During the heating, ammonia is evolved and the haloxanthine salt of the organic base is formed. On chilling this salt precipitates.

The following examples illustrate in more detail my invention, but in no way are to be construed as limiting it in spirit or in scope.

Example 1

12 g. of 2-(phenyl-benzylamino-methyl)-imidazoline which has the formula

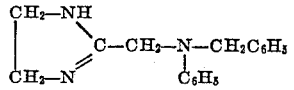

and 8 g. of 8-chlorotheophylline are dissolved in a hot mixture of 100 cc. of methyl ethyl ketone and 12 cc. of water. The hot solution is decanted from any undissolved material and chilled. Crystals of the 8-chlorotheophylline salt of 2-(phenyl-benzylamino-methyl)-imidazoline separate. These crystals are removed and dried. They melt at 204-205° C.

*Example 2*

14 g. of 2-(phenyl-benzylamino-methyl)-imidazoline and 10 g. of 8-bromotheophylline are dissolved in a hot mixture of 125 cc. of methyl ethyl ketone and 15 cc. of water. The hot solution is filtered and evaporated. The residue of the 8-bromotheophylline salt of 2-(phenyl-benzylamino-methyl)-imidazoline is triturated with ether and dried. A sample on analysis showed 14.9% bromine (calculated 15.2%).

I claim:

1. An 8-haloxanthine salt of an organic base of the formula

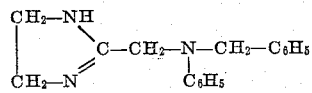

wherein the 8-haloxanthine contains a hydrogen atom at position 7.

2. An 8-halotheophylline salt of 2-(phenyl-benzylamino-methyl)-imidazoline.

3. The 8-chlorotheophylline salt of 2-(phenyl-benzylamino-methyl)-imidazoline.

4. The 8-bromotheophylline salt of 2-(phenyl-benzylamino-methyl)-imidazoline.

5. The process of producing a salt of an 8-haloxanthine containing a hydrogen atom in position 7 and an organic base of the formula

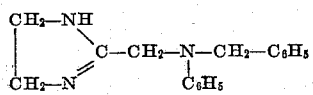

which comprises mixing a member of the group consisting of said 8-haloxanthine which contains a hydrogen atom in position 7 and the ammonium salt thereof with said organic base, dissolving the mixture in an inert water-soluble organic solvent at elevated temperature, precipitating the salt by chilling, and separating said salt.

6. The process of producing the 8-chlorotheophylline salt of 2-(phenyl-benzylamino-methyl)-imidazoline which comprises dissolving 8-chlorotheophylline and 2-(phenyl-benzylamino-methyl)imidazoline in hot methyl ethyl ketone and water, chilling the resulting solution, and separating the salt thus formed.

7. The process of producing the 8-bromotheophylline salt of 2-(phenyl-benzylamino-methyl)imidazoline which comprises dissolving 8-bromotheophylline and 2-(phenyl-benzylamino-methyl)imidazoline in hot methyl ethyl ketone and water and separating from the resulting solution the salt thus formed.

JOHN W. CUSIC.

No references cited.